United States Patent [19]

Corey

[11] 4,239,100
[45] Dec. 16, 1980

[54] PACKAGE FLOW SYSTEM

[75] Inventor: Robert L. Corey, Chicago, Ill.

[73] Assignee: Unarco Industries, Inc., Chicago, Ill.

[21] Appl. No.: 882,731

[22] Filed: Mar. 2, 1978

[51] Int. Cl.² .............................................. B60G 13/11
[52] U.S. Cl. .................................... 193/35 R; 193/37; 308/226
[58] Field of Search ...................... 193/35 R, 37, 35 J; 308/226; 29/4, 110, 148, 111 R; 211/49 R, 49 D

[56] References Cited

U.S. PATENT DOCUMENTS

| 3,023,487 | 3/1962 | Himxley | 308/221 |
| 3,586,142 | 6/1971 | Inwood | 193/35 X |
| 3,721,326 | 3/1973 | Bussienne | 193/35 R |
| 3,890,755 | 6/1975 | Specht | 193/35 R |
| 3,915,275 | 10/1975 | Specht | 193/35 R |

Primary Examiner—Richard A. Bertsch
Attorney, Agent, or Firm—Clement and Ryan

[57] ABSTRACT

A roller assembly having longitudinal ribs which snap fit into shelf members of a support frame. In one embodiment the shelf members have upright T-shaped end members with lateral extending feet that engage the ribs. In another embodiment the shelf members have longitudinal feet that engage the ribs. Preferably, the edge forming the underside of the roller assembly are supported by base portions of the shelf member.

16 Claims, 9 Drawing Figures

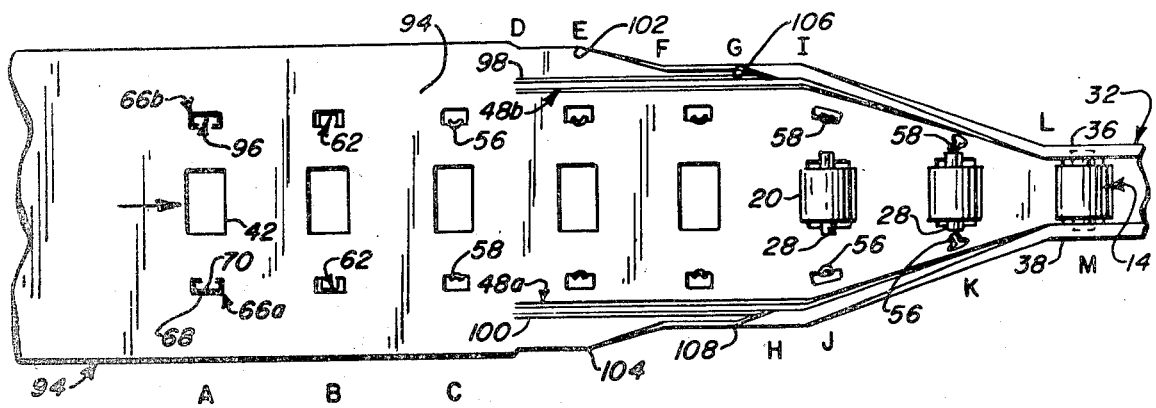
FIG. 1
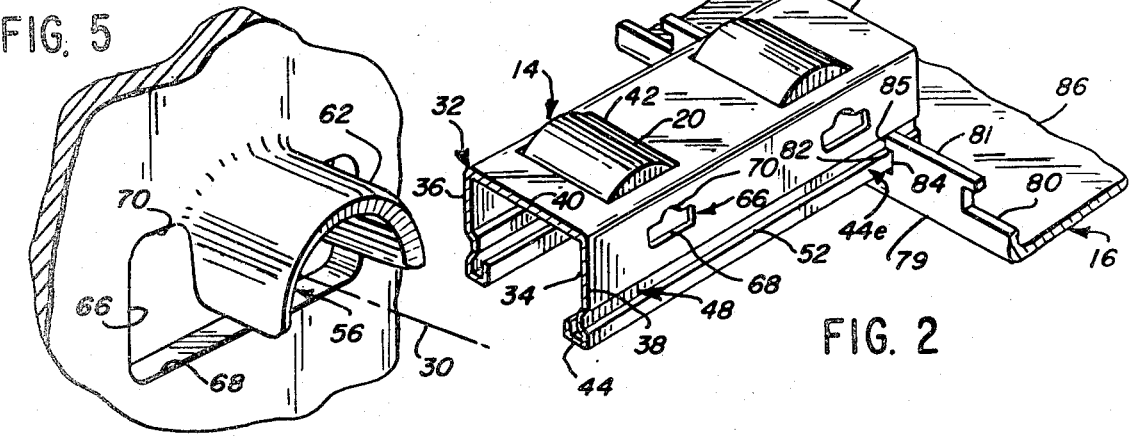
FIG. 5
FIG. 2
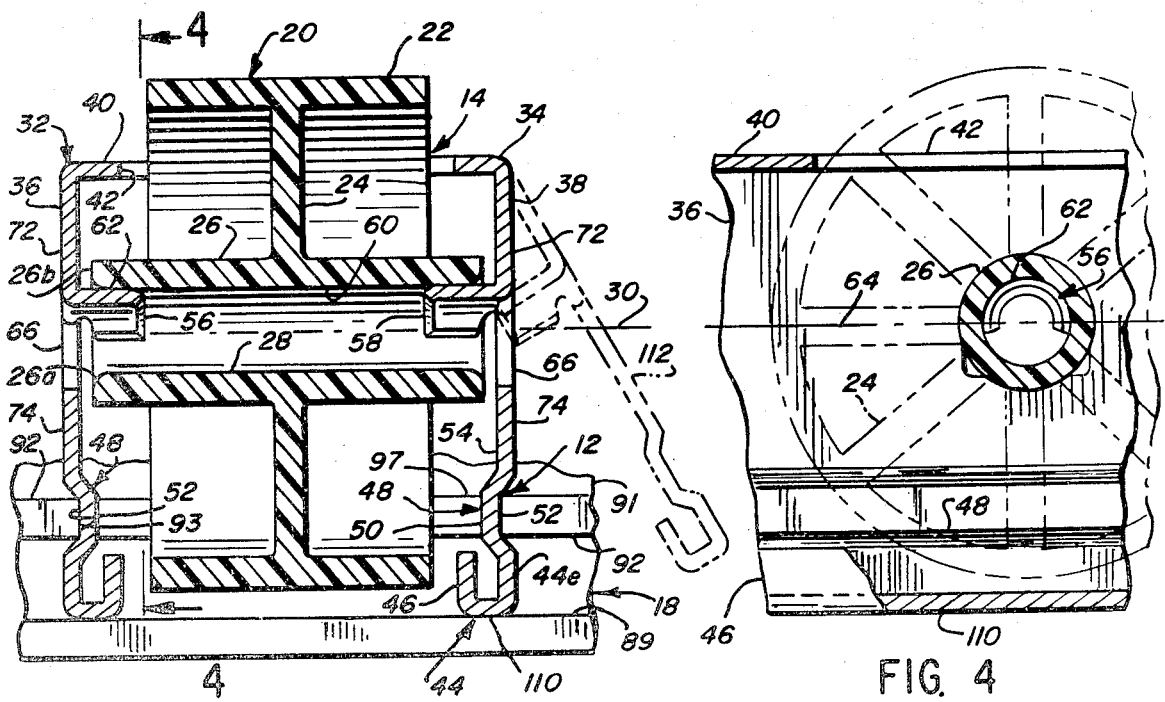
FIG. 3
FIG. 4

PACKAGE FLOW SYSTEM

BACKGROUND OF THE INVENTION

This invention relates to package flow systems, and more particularly to a roller assembly and support frame for use in package flow systems.

Over the years a number of roller assemblies have been developed for conveying, supporting and storing various packages and articles upon frames, flow tracks, racks and conveyor frames. These prior art roller assemblies have met with varying degrees of success.

One type of prior art roller assembly that has been developed has one or more rollers extending laterally outward of the side walls of the flow track or rail. Undesirably, the arrangement and positioning of these rollers occupy valuable storage and conveying space.

Another type of roller assembly that has been developed has rollers mounted between the side walls of the channel-shaped flow track. Typifying this type of roller assembly are the roller assemblies shown in U.S. Pat. Nos. 2,982,387; 3,023,487; 3,063,354 and 3,900,112. These rollers have outwardly extending spindles, axles and trunnions which are connected or intergrally formed with the roller and are supported by the shoulders of apertures or recesses of the flow track. Some of these roller assemblies are intricate and sometimes difficult and expensive to manufacture, assemble or install.

Various fasteners and structural components have also been developed for securing the flow track to a support frame or rack. These features and components include bolts, such as shown in U.S. Pat. No. 2.982,387 hooks, such as shown in U.S. Pat. No. 3,063,354, and tabs, such as shown in U.S. Pat. No. 3,900,112.

It is therefore desirable to provide an improved roller assembly which is easier and less expensive to manufacture, assemble and install, and to provide an improved support frame for firmly supporting the roller assembly.

SUMMARY OF THE INVENTION

An improved roller assembly and support frame are provided for use in a package flow system. The roller assembly is of relatively simple design and construction and is generally easy and inexpensive to manufacture, assemble and install.

The roller assembly has a channel-shaped frame or rail which is operatively connected to and supports at least one and preferably a plurality of longitudinally spaced rollers. The rail has a pair of upright side walls with lower edges and an intermediate section that extends between and connects the side walls. Advantageously, each of the side walls has a rib, which is preferably longitudinal. Desirably, each rib extends laterally inwardly to provide an upright grasping surface.

The novel support frame includes a plurality of shelf members which firmly support the roller assembly. Each shelf member has rib-engaging feet which snap fit and interlocking engage the ribs of the roller assembly. Each shelf member also has a base or base portions which engage and support the lower edges of the rail.

In one embodiment of the shelf member includes an upright support section having a plurality of T-shaped end members that extend upwardly from the base. Each of the T-shaped end members has a laterally extending foot that engages the ribs.

In another embodiment, the feet of the shelf member are generally horizontal and extend longitudinally above the base to engage the ribs.

Desirably, the front shelf member has an inclined side that extends above the height of the base. An abutment plate extends downwardly from the upper portion of the inclined side to provide an abutment stop for the front end of the rail during installation of the rail in the support frame, and an abutment stop for packages during use of the package flow system.

Preferably, the rear shelf member has a generally upright side and a generally horizontal top. An abutment plate extends downwardly from the horizontal top. In the illustrative embodiment, the upright side of the rear shelf member is of a lesser height than the overall height of the inclined side of the front shelf member.

In the preferred form, the ribs and the feet are in general horizontal alignment with each other and the minimum distance between the grasping surface of the ribs are normally greater than the minimum distance between the feet prior to assembling the roller assembly to the support frame, so that the ribs snap fit against the feet of the shelf members.

In order to assemble the roller assembly to the novel members, the side walls of the roller assembly are temporarily compressed so as to span a distance less than the minimum distance between the feet of the shelf members. The roller assembly is then inserted and placed between the feet so that the ribs are aligned with the feet. Upon releasing the side walls, the ribs securely engage and are biased against the feet.

While the roller assembly can be manufactured and assembled by various methods and processes, the preferred method and process includes the steps of: providing a generally continuous imperforate web of metal; providing a roller having a hub defining a socket; advancing the web through a series of processing stations including sequentially blanking or stamping the web to form a series of longitudinally spaced pairs of side wall openings without completely severing the stamped material from the web, arcuately bending the stamped material to form arcuate surfaces, bending the arcuate surfaces generally perpendicular to the web to form arcuate shaft sections extending integrally and laterally from the web, placing the roller adjacent the web, aligning the axial socket with the arcuate shaft sections, bending the web to form a channel-shaped rail frame with upright side walls and an intermediate section extending between and integrally connecting the upright side walls, and concurrently inserting the arcuate shaft sections into the axial sockets to provide arcuate bearing surfaces for the roller as the web is being bent into the channel-shaped rail frame.

Desirably, longitudinally spaced roller-receiving openings are sequentially blanked or stanped in the web simultaneous with the side wall openings. Preferably, the roller-receiving openings are generally rectangular in shape and have a dimension perpendicular to the lateral axis less than the maximum diameter of the outer cylindrical surface of the roller.

In the illustrative embodiment the web is indented to form a pair of generally parallel longitudinal ribs, and the side wall defining portions of the web are bent to form generally U-shaped edges.

For ease of assembly, the arcuate shaft sections can be bent at an angle slightly less than 90 degrees from the side walls to form tapered shaft sections.

A more detailed explanation of the invention is provided in the following description and appended claims taken in conjunction with the accompanying drawings.

BRIEF DESCRIPTION OF THE DRAWINGS

FIG. 1 is a schematic representation of a method of forming a roller assembly in accordance with principles of the present invention;

FIG. 2 is a perspective view of a package flow system with a roller assembly supported by a shelf member of a support frame in accordance with principles of the present invention;

FIG. 3 is a enlarged cross-sectional end view of a package flow system with the roller assembly supported by another type of shelf member in accordance with principles of the present invention;

FIG. 4 is a fragmentary longitudinal view of the roller assembly taken substantially along lines 4—4 of FIG. 3 with parts broken away for ease of illustration and clarity;

FIG. 5 is an enlarged perspective view of an arcuate shaft section that together with a similar, axially opposed arcuate shaft section supports a roller;

DETAILED DESCRIPTION OF THE ILLUSTRATIVE EMBODIMENT

Figure 6:
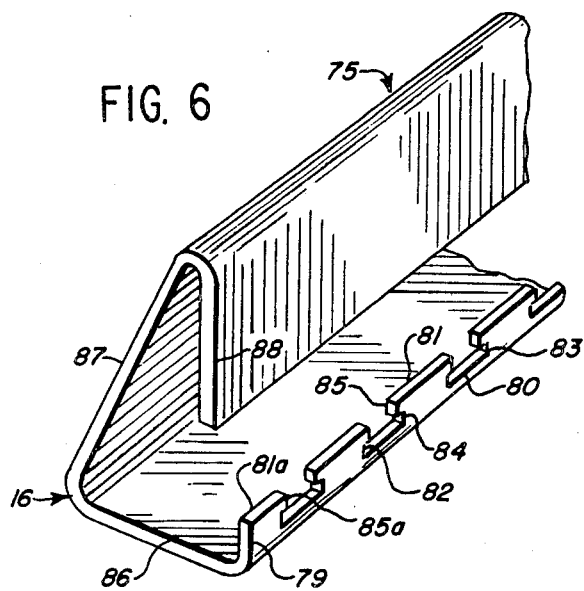
FIG. 6 is a fragmentary perspective view of the front shelf member illustrated in FIG. 2.

FIGS. 2 and 3 of the drawings illustrate package flow systems 10 and 12, respectively, having an improved impact-resistant roller assembly 14 which is particularly useful for conveying, supporting and storing packages, cartons, containers and other articles upon shelve members of a support frame, rack or track assembly 16 or 18. The roller assembly 14 can also be useful in gravity conveyor systems and other conveyor assemblies.

Roller assembly 14 includes a plurality of cylindrical rollers 20 which are preferably longitudinally spaced from each other at equal intervals and made of impact-resistant plastic having a relatively low coefficient of friction, such as nylon or high density polyethylene. In some circumstances it may be desirable to make the roller 20 out of other materials, such as metal, wood or rubber.

Each roller 20 has an outer cylindrical load-supporting surface 22 (FIG. 3) for engaging, dynamically supporting and conveying a load, such as a package, carton, container or other articles. A plurality of circumferentially spaced ribs 24 extend radially inwardly from the outer load-supporting surface 22 to a centrally disposed tubular hub 26. In the illustrative embodiment there are two sets of four circumferentially spaced ribs 24 which are laterally and angularly offset from each other.

Hub 26 defines an elongated, axial shaft sections-receiving socket 28 extending along a lateral axis 30. Socket 28 provides a cylindrical bearing surface for the shaft sections 56 and 58. The outer lateral edges or ends 26a of the hub 26 are also rounded or chamfered radially inwardly for ease of insertion of the shaft sections 56 and 58. Desirably, the outermost portion 26b of the outer lateral edges or ends 26a is generally upright and serves as a thrust bearing or bearing surface that ocassionally rotatably engages the side walls 36 and 38 of the rail 34. Preferably, hub 26 and socket 28 extend laterally outward of both sides of the outer load-supporting surface 22 as well as ribs 24, a sufficient amount or length to maintain adequate clearance between the outer load-supporting surface 22 and the top 40 of the rail 34 to prevent the roller 20 from rubbing against the top 40 of the rail.

It is believed that the construction and arrangement of the illustrative roller is less expensive and easier to mold within closer dimensional tolerances than some prior art rollers having connected axles, trunnions and spindles.

One of the many advantages of the present invention is the provision of a unitary one-piece rail frame assembly 32 that rigidly and rotatably supports the roller 20. The unitary rail frame assembly 32 includes an elongated generally channel-shaped rail frame 34 which is sometimes referred to as a "rail" to "track." In the preferred embodiment, the rail 34 generally has the configuration of an inverted U and is made of resilient steel or other resilient metal. Structurally, the rail 34 has a pair of generally parallel upright side walls 36 and 38 and a generally planar intermediate section 40 extending generally horizontally between and integrally connecting the side walls 36 and 38. In the preferred form, intermediate section 40 is positioned above the lateral axis 30 and provides the top of the rail 34.

Intermediate section 40 has a plurality of roller-receiving openings 42 which are longitudinally spaced apart from each other. Each roller-receiving opening 42 receives one of the rollers. Preferably, each roller-receiving opening 42 is generally rectangular in shape and has a longitudinal dimension perpendicular to the lateral axis 30 less than the maximum diameter of the outer cylindrical surface 22 and a size less than the maximum size of the roller 20 received in the opening 42 taken along an imaginary horizontal plane cut through the lateral axis 30 of that roller 20 as viewed in top plan view, but has a width greater than the roller 20, so that only the outer surface 22 and a portion of that roller 20 projects upwardly out of the roller-receiving opening 42 above the top 40 of the rail 34. This construction and arrangement permits the packages to roll upon the rollers 20 generally without rubbing against the rail 34.

Side walls 36 and 38 each have a U-shaped lower end or edge 44 with an upwardly turned flange or lip 46 that extends generally vertically towards the top 40 to provide additional reinforcement for the frame assembly 32. The upwardly turned flanges 46 of the side walls 36 and 38 are in general parallel relationship to each other and are of the same height.

In order to further reinforce the unitary frame assembly 32 and provide a gripping and engaging surface for a support frame or rack 16 and 18, each side wall 36 and 38 has a longitudinal reinforcing and stiffening rib 48 that is located closely adjacent to the lower end 44 of the rail 34, beneath the lateral axis 30. In the preferred form, the reinforcing ribs 48 of the side walls 36 and 38 are positioned in general horizontal alignment and parallel relationship to each other and extend laterally inwardly to form a longitudinal upright inner rib wall 50 generally about the vertical center line of the U-shaped lower end 44 and a longitudinal generally planar and upright grasping surface or outer rib wall 52 generally vertically aligned with the upright inner side wall surfaces 54.

In order to rotatably and securely support the rollers 20 in a manner which is relatively simple, inexpensive and easy to manufacture, assemble and install, the unitary rail frame assembly 32 includes pairs of arcuate shaft sections or pintles 56 and 58 that are spaced longitudinally along the rail 34. Each pair of arcuate shaft sections 56 and 58 extend integrally and laterally inwardly from the side walls 36 and 38, respectively, into a socket 28 of one of the rollers 20. Desirably, each pair of arcuate shaft sections 56 and 58 are positioned in general horizontal alignment and are axially spaced from each other to define an axial opening 60 therebetween.

Preferably, arcuate shaft sections 56 and 58 are tapered or slanted laterally inwardly in a downward direction from the lateral axis 30 towards an opposite side wall for ease of assembly. In the illustrative embodiment the unattached ends of the shaft sections 56 and 58 are tapered downwardly ½ degree from the lateral axis 30. It is believed that the downward taper also makes the shaft sections 56 and 58 easier to fabricate and provide high spots with minimum frictional surface area for quicker and smoother rotation of the roller 20.

Desirably, the innermost edge of the unattached ends of the shaft section 56 and 58 are curved or chamfered downwardly so as not to engage and interfere with rotation of the roller 20.

As shown in FIGS. 4 and 5, each shaft section 56 and 58 is preferably arcuately shaped or semi-tubular with a cross-sectional configuration of an inverted U or upstanding arch as viewed laterally, and has an outer surface 62 that faces upwardly to provide an upper bearing frame surface upon which the roller 20 can rotate. It is preferred that the shaft sections 56 and 58 each extend arcuately at a generally equal radius more than 180 degrees about the longitudinal axis 64 of its associated side wall 36 and 38 to provide adequate support for the roller 20. In the illustrative embodiment, the lower edges of each arcuate shaft section 56 and 58 extend about 30 degrees, respectively, below the longitudinal axis 64 so that each arcuate upper bearing surface 62 extends about 240 degrees.

For economy of material and manufacture, the shaft sections 56 and 58 are formed from material blanked and bent out of the side walls 36 and 38. To this end, each side wall 36 and 38 has a series of specially configured side wall openings or apertures 66 which are longitudinally spaced apart from each other. Each opening 66 has a generally U-shaped lower portion 68 (FIG. 2) and an upper portion 70 that is generally "omega" or horseshoe-shaped.

The upper wall portion 72 (FIG. 3) immediately above and adjacent the arcuate shaft section 56 and 58 of each side wall 36 and 38 is in vertical alignment with the lower side wall portion 74 extending immediately beneath and adjacent the side wall openings 66. Preferably, upper and lower wall portions 72 and 74 are substantially planar or flat and are positioned in general coplanar relationship to each other.

In order to rigidly and firmly support the longitudinal ends of the rail 34 and roller assembly 14, an improved support frame 16 or 18 (FIGS. 2, 3 and 6–9) having front shelf or shelving members 75 or 76 (FIGS. 6 and 8) and rear shelf or shelving members 77 or 78 (FIGS. 7 and 9) is provided.

The front shelf member 75 in FIGS. 2 and 6 includes an upright support section 79 with a base or horizontal ledge portions 80 that engage and support the lower edges 44 of the rail 34 so as to firmly support the front end 34f of roller assembly 14. Upright support section 79 has generally upright T-shaped end members 81 extending upwardly from the base or horizontal ledge portions 80. Each T-shaped member 81 has a pair of laterally spaced side portions 82 that are generally L-shaped and symmetrical and complementary to each other. Each side portion 82 has an upright edge 84 and a laterally extending gripping and rib-engaging foot 85. The adjacent upright edges 84 and feet 85 of adjacent T-shaped members 81 are positioned closely adjacent the outer side wall portions 44e of the lower edges 44 of the rail 34 and engage the grasping surfaces 52 of the longitudinal ribs 48, respectively, and are connected by and cooperate with a base or ledge portions 80 to define a pair of inverted T-shaped rail-receiving openings 83 for snugly receiving and engaging the side walls 36 and 38 of the rail 34. Feet 85 also serve to stabilize the positioning of the rail 34. In some circumstances it may be desirable that the upright edges 84 extend above the feet 85.

At the lateral ends of the support section 79 (FIG. 6) there are inverted L-shaped upright end members 81a. Each end member 81a has only one laterally extending foot 85a. Foot 85a faces laterally inward.

A generally horizontal bottom 86 (FIG. 6) is integrally connected to the upright support section 79. An inclined or sloped side 87 extends upwardly and rearwardly from the bottom 86. A generally upright head plate or abutment plate 88 depends downwardly from the upper edge portion or top of the inclined side 87 and is spaced forwardly of the upright support section 79. Abutment plate 88 serves as a stop or abutment surface for the rail 34 as well as the packages. Preferably, the corners formed at the junctions of the abutment plate 88, inclined side 87, bottom 86 and upright support section 79, respectively, are rounded to minimize concentration of stresses on the front shelf member 75.

Figure 7:
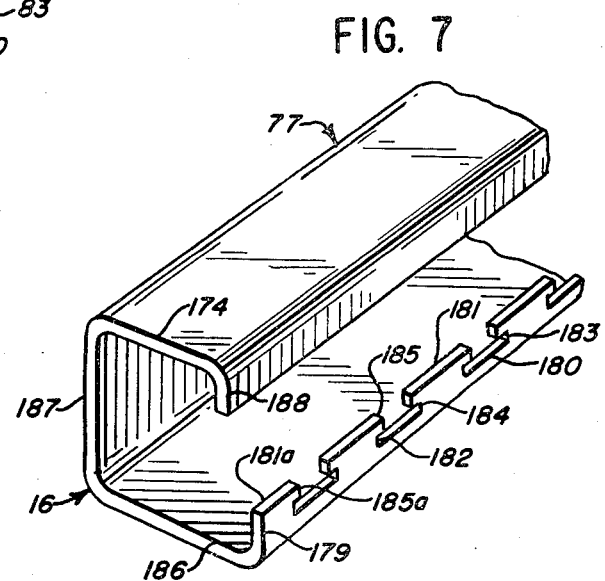
FIG. 7 is a fragmentary perspective view of a rear shelf member.

The rear shelf member 77 in FIG. 7 is similar to the front shelf member 75, except that its side 187 is generally upright rather than inclined and is of a lesser overall height than the inclined side 87 (FIG. 6) of the front shelf member 75. The rear shelf member 77 is also squared off to have a generally flat or planar top 174, and the downwardly extending abutment plate or head plate 188 is spaced rearwardly of the upright support section 179 to engage the rearward end of the rail 34.

The upright support section 179 (FIG. 7) of the rear shelf member 77 is generally similar to the upright support section 79 (FIG. 6) of the front shelf member 75 and for ease of understanding and clarity, similar parts have been given similar numbers, but increased by 100, such as base 180, foot 185, etc. When installed, the upright support section 179 and head plate 188 of the rear shelf member 77 generally face the upright support section 79 (FIG. 6) and head plate 88, respectively, of the front shelf member 75.

Figure 8:
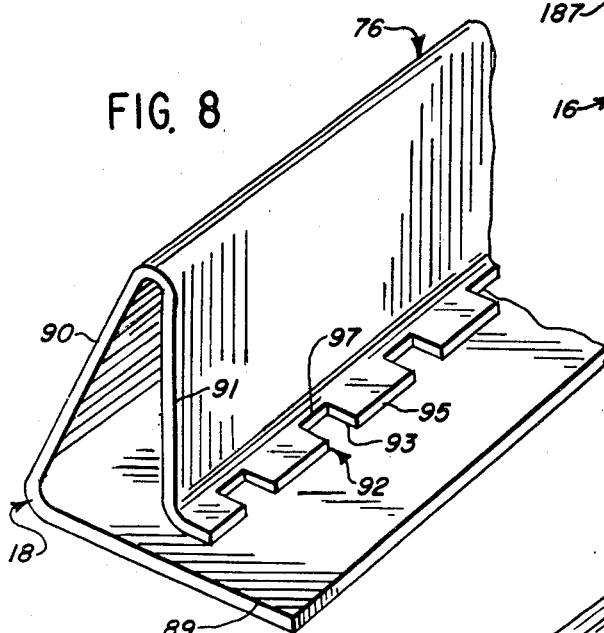
FIG. 8 is a fragmentary perspective view of the front shelf member illustrated in FIG. 3.

The front shelf member 76 in FIG. 8 has an elongated generally horizontal base, bottom or base portion 89 which supportingly engages the lower edges 44 of the rail 34 to support the roller asembly 14. An inclined or sloped side 90 extends upwardly and rearwardly from the base 89. A generally upright head plate or abutment plate 91 depends downwardly from the upper edge portion or top of the inclined side 90. Abutment plate 91 serves as a stop or abutment surface for the packages. Longitudinal feet or shelf surfaces 92 extend generally horizintally and in a longitudinal direction from the lower portion or bottom of the abutment plate 91. Each foot 92 has a pair of laterally opposed longitudinal sides or upright edges 93. The unattached rearward edge of the longitudinal feet 92 are positioned forwardly of the rearward edge of the base 89. The adjacent upright edges 93 of adjacent feet 92 are connected by one of a plurality of lateral abutment portions 97 and engage the upright grasping surfaces 52 of the longitudinal ribs 48. Lateral abutment portions 97 are spaced rearwardly of the abutment plate 91 and serve as a stop or abutment surface for the front end 34f of the rail 34. Feet 92 also serve to stabilize the positioning of the shelf member 76.

Figure 9:
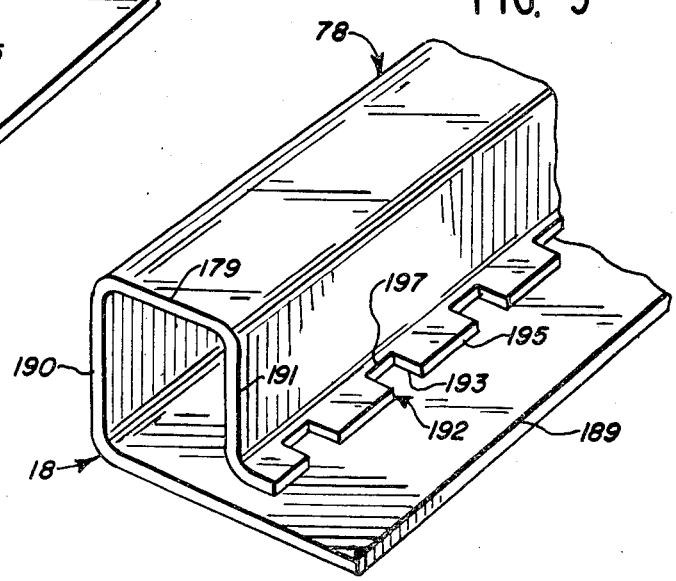
FIG. 9 is a fragmentary perspective view of another rear shelf member.

The rear shelf member 78 in FIG. 9 is similar to the front shelf member 78 (FIG. 8) except that the side 190 is generally upright rather than inclined and has a height less than the overall height of the inclined side 90 (FIG. 8) of the front shelf member 76. The rear shelf member 78 is also squared off to provide a generally horizontal top 179 from which depends a downwardly extending abutment plate or head plate 191. The longitudinal feet 192 are substantially similar to the longitudinal feet 92 (FIG. 8) of the front shelf member 76 and the head plate 191 and feet 192 are spaced rearwardly of the front edge of the base 189. When installed, the head plates 191 and 91 of the rear and front shelf members 78 and 76 (FIGS. 9 and 8) generally face each other.

Preferably, the longitudinal ribs 48 snap fit into interlocking engagement with the feet 85 and 185 (FIGS. 2, 6 and 7) and 92 and 192 (FIGS. 3, 8 and 9). To this end the minimum distance between the grasping surfaces 52 of the roller assembly 14 (before engaging the support frames 16 and 18) should normally be slightly greater than the minimum distance between each of the adjacent rib-engaging feet 85, 185, 92 and 192.

In order to assemble the roller assembly 14 to the support frames 16 and 18 (FIGS. 2 and 3), the side walls 36 and 38 of the roller assembly 14 are temporarily compressed inwardly so that the minimum distance between the grasping surfaces 52 is less than normal minimum distance between the uncompressed grasping surfaces 52 and is less than the minimum lateral distance between engagement feet 85, 185, 92 and 192 of each shelf member 75-78, respectively. The roller assembly 14 is then inserted and positioned between the T-shaped end members 81 and 181 (FIGS. 2, 6 and 7) or longitudinal feet 92 and 192 (FIGS. 3, 8 and 9) so that the longitudinal ribs 48 are aligned with the feet 85 and 185 or 92 and 192, respectively. Upon releasing the side walls 36 and 38, the outer rib walls or grasping surfaces 52 will expand, snap-fittingly engage and be biased against the feet 85 and 185, or 92 and 192. Preferably, the lower ends or underside 44 of the roller assembly 14 is positioned upon the base 80, 180, 89 or 189 (FIGS. 6-9) and the front end of the rail 34 is positioned in abutting confrontation against the front abutment plate 88 (FIG. 6) or abutment portion 97 (FIG. 8) or closely adjacent thereto.

While the roller assembly 14 can be made and manufactured by various means, a preferred method and process for making the roller assembly 14 is shown in FIG. 1.

In FIG. 1, a generally continuous imperforate web or sheet 94 of metal is provided in a generally planar or flat condition. Web 94 is sequentially, consecutively and systematically fed and advanced, left to right, as shown in FIG. 1, in a generally continuous manner through a series of processing or forming stations A–M to form the unitary rail frame assembly 32 and roller assembly 14 (FIGS. 2 and 3). During the forming process, the unitary rail frame assembly 32 and roller assembly 14 is formed and assembled, respectively, in an inverted or upside down state or condition and is subsequently installed right side up.

As the web 94 passes station A, web 94 is sequentially blanked or stamped to form longitudinally spaced sets of aligned openings, including roller-receiving openings 42 and laterally opposite pairs of side wall openings 66a and 66b in lateral alignment with the roller-receiving openings 42. Desirably, each of the roller-receiving openings 42 are rectangular in shape and have an area less than the maximum area of the roller 20 to be inserted in said opening 42 taken through the lateral axis 30 (FIG. 3) of the roller 20 as viewed in top and bottom plan views. In some circumstances it might be desirable that the roller-receiving openings 42 and the side wall openings 66a and 66b are blanked or stanped at different stations and times, rather than simultaneously at station A.

In order to provide integral shaft sections 56 and 58 (FIG. 3) integral with side walls 36 and 38, the side wall openings 66a and 66b are stamped or blanked without completely severing the blanked material 96 from the web 94. Specifically, U-shaped lower portions 68 of the side wall openings 66a and 66b are blanked and severed, while upper portions 70 remain in tact and unsevered.

At station B, the unsevered materials 96 blanked from the side wall openings 66a and 66b are arcuately raised or bent to form the arcuate upper surfaces 62.

At station C, the arcuate surfaces 62 are bent or turned upwardly to form the arcuate shaft sections 56 and 58. Preferably, the arcuate surfaces 62 are bent at an angle slightly less than 90 degrees from the side wall defining portions of the web 94, such as about 89.5 degrees, to form the tapered axially spaced shaft sections 56 and 58 for ease of assembly and insertion into axial socket 28.

At station D web 94 is indented in an upward direction at two rib forming locations 98 and 100 to form a pair of generally parallel reinforcing and stiffening ribs 48a and 48b. Because some of the metal is pushed out of the plane of the web to form the ribs 48a and 48b at station D, the overall width of the web 94 is thereafter reduced.

At station E the outer lateral edges 102 and 104 of the web 94 are bent upwardly about 90 degrees in the beginning stages of a generally continuous roll forming process to form the end flanges 46 (FIG. 3). At station F the flanges 46 are completely bent and web 94 is advanced to station G.

At station G the unbent outer lateral edges 106 and 108 of the side wall defining portions of the web 94 are bent or turned upwardly about 90 degrees to form horizontal end portions or bights 110 (FIG. 3) and the generally U-shaped edges 44 of the side walls 36 and 38. At station H the edges 44 of the side walls 36 and 38 are completely formed and the web 94 is advanced to station I.

At station I the web 94 is performed by partially turning or bending the web 94 to form semi-formed side walls 112 at about a 45 degree angle as shown in phantom or dotted line in FIG. 3.

At station J an impact-resistant roller 20, which has been previously molded or otherwise formed, is positioned and placed upon the web 94 with its axial socket 28 extending transversely or laterally in a direction towards the arcuate shaft sections 56 and 58. Preferably, the web 94 is being continuously roll formed at station J, although in some circumstances it may be desirable to stop roll forming at station J to permit placement of the roller 20 upon the web 94.

As the web 94 passes station K the side walls 36 and 38 are being turned and formed and the arcuate shaft sections 56 and 58 will begin entering the axial socket 28 of the roller 20 to form upper bearing surfaces 62 (FIGS. 4 and 5).

At station L, the side walls 36 and 38 are completely bent or turned upwardly, generally at right angles to the horizontal intermediate section 40 (FIGS. 2 and 3) of the rail 34.

At station M, the unitary rail assembly 32 is completely formed with the arcuate shaft sections 56 and 58 completely inserted into the axial socket 28 and engaging the hub 26 (FIG. 2) of the roller 20, with the shaft sections 56 and 58 in general axial alignment with each other. Thereafter, the web 94 can be cut or severed across its width at any desired length to provide a rail 34 (FIG. 2) with the desired number of rollers 20.

While the various steps required in the formation of the roller assembly 14 have been described as being carried out in a preferred order at separate stations, it may be desirable in some situations, to carry out these steps in a different order or to perform several of the operations simultaneously.

The preceding description has been given for ease of understanding only. No unnecessary limitations are to be understood therefrom as modifications will be obvious to those skilled in the art.

What is claimed is:

1. A package flow system, comprising:
   a roller assembly including
      a channel-shaped frame having a pair of upright side walls and an intermediate section extending between and connecting said side walls, each of said side walls having a longitudinal frame-engaging rib, a generally upright inner side wall surface and a lower edge beneath said intermediate section; and
      a plurality of rollers operatively connected to said side walls, each of said rollers including a cylindrical load-supporting surface for dynamically supporting a load;
   each of said longitudinal frame-engaging ribs extending longitudinally along one of said upright side walls with portions extending longitudinally between said rollers and having an outer rib wall providing a generally upright grasping surface in general vertical alignment with one of said upright inner side wall surfaces and an inner rib wall extending laterally inwardly from said upright inner side wall surface; and
   a support frame having a shelf member including
      rib-engaging feet with generally upright portions for snap-fitting interlocking engagement with said upright grasping surfaces of said longitudinal ribs; and
      base means for engaging said lower edges to support said roller assembly.

2. A package flow system in accordance with claim 1 wherein:
   said shelf member includes an upright support section having a plurality of generally T-shaped end members extending upwardly from said base means, said generally T-shaped end members defining at least one inverted T-shaped rail receiving opening for snugly receiving said longitudinal frame-engaging ribs and portions of said upright side walls of said channel-shaped frame beneath said longitudinal frame-engaging ribs, and
   said T-shaped end members having laterally extending feet providing said rib-engaging feet.

3. A package flow system in accordance with claim 1 wherein:
   said rib-engaging feet include a plurality of generally horizontal longitudinal feet extending generally horizontally and in a longitudinal direction, said plurality of feet being spaced longitudinally along said shelf member and connected to each other by lateral abutment positions, and said feet being spaced above said base means.

4. A package flow system in accordance with claim 1 wherein said shelf member comprises a front shelf member having:
   an inclined side extending above said base means, and
   an abutment plate depending downwardly from said side for providing an abutment stop for packages during use of said package flow system.

5. A package flow system in accordance with claim 1 wherein said shelf member comprises a rear shelf member having:
   a generally upright side,
   a generally horizontal top, and
   an abutment plate depending downwardly from said top.

6. A package flow system in accordance with claim 1 wherein:
   said rib-engaging means includes a first rib-engaging means engaging one of said longitudinal ribs and a second rib-engaging means engaging the other of said longitudinal ribs;
   said longitudinal ribs and said rib-engaging means being in general horizontal alignment with each other; and
   the minimum distance between said grasping surfaces being normally greater than the minimum distance between said first and second rib-engaging means prior to assembling said roller assembly to said support frame.

7. A package flow system, comprising:
   a roller assembly including
      a plurality of rollers spaced longitudinally from each other;
      each of said rollers having an outer cylindrical load-supporting surface for dynamically supporting a load, a plurality of circumferentially spaced ribs extending radially inward from said cylindrical load-supporting surface, and a hub connected to said radial ribs, said hub defining a lateral axis and an axial socket extending laterally along said lateral axis, and said axial socket extending laterally outward of said cylindrical load-supporting surface;
      a unitary frame assembly for rotatably supporting said rollers and including a generally channel-shaped frame having a pair of upright side walls and an intermediate section extending between and connecting said side walls, said intermediate section positioned above said lateral axis and defining a plurality of generally rectangular roller-receiving openings spaced longitudinally from each other, each of said roller-receiving openings receiving one of said rollers and having a dimension perpendicular to said lateral axis less than the maximum diameter of the outer cylindrical load-supporting surface of said roller received in said opening, each of said side walls defining a longitudinal axis intersecting said lateral axis, each of said side walls having a longitudinal rib located beneath said longitudinal axis and having a generally U-shaped edge disposed generally beneath said longitudinal rib, and said edge having an upwardly turned flange extending generally vertically towards said intermediate section;

said unitary frame assembly including pairs of arcuate shaft sections formed from said side walls and spaced longitudinally along said side walls for rotatably supporting said rollers;

each of said pairs of arcuate shaft sections being in general horizontal alignment with each other for insertion into the axial socket of one of said rollers and comprising a first arcuate shaft section extending integrally and laterally inwardly from one of said upright side walls and a second arcuate shaft section extending integrally and laterally inwardly from the other of said upright side walls towards said first shaft section, said first and second arcuate shaft sections each having an outer surface facing generally upwardly to provide an upper bearing frame surface for said roller and said first and second arcuate shaft sections being axially spaced from each other to define an axial opening therebetween, each arcuate shaft section having the shape of an inverted U and defining an upstanding arch as viewed laterally and being tapered slightly inwardly in a downward direction toward an opposite wall, and said upper bearing surface extending greater than 180 degrees about said longitudinal axis; and a support frame having a shelf member including rib-engaging means for snap-fitting interlocking engagement with said longitudinal ribs, and base means for engaging said U-shaped edges to support said roller assembly.

8. A package flow system in accordance with claim 7 wherein each longitudinal rib extends laterally inwardly to provide an upright grasping surface.

9. A package flow system in accordance with claim 8 wherein:
said shelf member includes an upright support section having a plurality of T-shaped end members extending upwardly from said base means, and
each of said T-shaped end members has a laterally extending foot providing said rib-engaging means.

10. A package flow system in accordance with claim 8 wherein:
said rib-engaging means include generally horizontal longitudinal feet spaced above said base means.

11. A package flow system in accordance with claim 7 wherein said shelf member comprises a front shelf member having:
an inclined side extending above said base means, and
an abutment plate depending downwardly from said side for providing an abutment stop for packages during use of said package flow system.

12. A package flow system in accordance with claim 7 wherein said shelf member comprises a rear shelf member having:

a generally upright side,
a generally horizontal top, and
an abutment plate depending downwardly from said top.

13. A package flow system in accordance with claim 8 wherein:
said rib-engaging means includes a first rib-engaging means engaging one of said longitudinal ribs and a second rib-engaging means engaging the other of said longitudinal ribs;
said longitudinal ribs and said rib-engaging means being in general horizontal alignment with each other; and
the minimum distance between said grasping surfaces being normally greater than the minimum distance between said first and second rib-engaging means prior to assembling said roller assembly to said support frame.

14. A package flow system, comprising:
a roller assembly including
a channel-shaped frame having a pair of upright side walls and an intermediate section extending between and connecting said side walls, each of said side walls having a rib and a lower edge; and
a roller operatively connected to said side walls and including a cylindrical load-supporting surface for dynamically supporting a load; and a support frame having a shelf member including
rib-engaging means for snap-fitting interlocking engagement with said ribs; and
base means for engaging said lower edges to support said roller assembly;
said shelf member comprising a front shelf member having
an inclined side extending above said base means; and
an abutment plate depending downwardly from said side for providing an abutment stop for packages during use of said package flow system.

15. A package flow system, comprising:
a roller assembly including
a channel-shaped frame having a pair of upright side walls and an intermediate section extending between and connecting said side walls, each of said side walls having a rib and a lower edge; and
a roller operatively connected to said side walls and including a cylindrical load-supporting surface for dynamically supporting a load; and a support frame having a shelf member including
rib-engaging means for snap-fitting interlocking engagement with said ribs; and
base means for engaging said lower edges to support said roller assembly;
said shelf member comprising a rear shelf member having
a generally upright side;
a generally horizontal top; and
an abutment plate depending downwardly from said top.

16. A package flow system, comprising:
a roller assembly including
a channel-shaped frame having a pair of upright side walls and an intermediate section extending between and connecting said side walls, each of said side walls having a longitudinal rib and a lower edge; and a roller operatively connected to said side walls and including a cylindrical load-supporting surface for dynamically supporting a load; and a support frame having a shelf member including
rib-engaging means for snap-fitting interlocking engagement with said ribs; and
base means for engaging said lower edges to support said roller assembly;

each rib extending laterally inwardly to provide an upright grasping surface;

said rib-engaging means including a first rib-engaging means engaging one of said longitudinal ribs and a second rib-engaging means engaging the other of said longitudinal ribs;

said longitudinal ribs and said rib-engaging means being in general horizontal alignment with each other; and the minimum distance between said grasping surfaces being normally greater than the minimum distance between said first and second rib-engaging means prior to assembling said roller assembly to said support frame.

* * * * *